United States Patent
Brandt et al.

(10) Patent No.: US 10,319,101 B2
(45) Date of Patent: Jun. 11, 2019

(54) SYSTEMS AND METHODS FOR DERIVING SPATIAL ATTRIBUTES FOR IMAGED OBJECTS UTILIZING THREE-DIMENSIONAL INFORMATION

(71) Applicant: Quantum Spatial, Norcross, GA (US)

(72) Inventors: David Brandt, Portland, OR (US);
Andrew Wakefield, Portland, OR (US);
Logan McConnell, Portland, OR (US);
Anand Iyer, Flower Mound, TX (US)

(73) Assignee: Quantum Spatial, Inc., St. Petersburg, FL (US)

( * ) Notice: Subject to any disclaimer, the term of this patent is extended or adjusted under 35 U.S.C. 154(b) by 206 days.

(21) Appl. No.: 15/193,782

(22) Filed: Jun. 27, 2016

(65) Prior Publication Data
US 2017/0243405 A1 Aug. 24, 2017

Related U.S. Application Data

(60) Provisional application No. 62/299,329, filed on Feb. 24, 2016.

(51) Int. Cl.
*G06T 7/33* (2017.01)

(52) U.S. Cl.
CPC ...... *G06T 7/33* (2017.01); *G06T 2207/10028* (2013.01); *G06T 2207/30184* (2013.01)

(58) Field of Classification Search
CPC ... G06T 2207/10028; G06T 2219/2004; G06T 7/30–38; G06T 7/586; G06T 2200/32; G01S 17/89; G01S 17/023
See application file for complete search history.

(56) References Cited

U.S. PATENT DOCUMENTS

| | | | |
|---|---|---|---|
| 5,233,357 A | 8/1993 | Ingensand et al. | |
| 7,187,809 B2 | 3/2007 | Zhao et al. | |
| 2008/0310757 A1 | 12/2008 | Wolberg et al. | |
| 2013/0155058 A1* | 6/2013 | Golparvar-Fard | G06T 19/006 345/419 |
| 2013/0222592 A1* | 8/2013 | Gieseke | G08G 1/04 348/148 |
| 2015/0036916 A1 | 2/2015 | Mundhenk et al. | |
| 2015/0123995 A1* | 5/2015 | Zavodny | G06T 11/60 345/630 |

FOREIGN PATENT DOCUMENTS

CN 100444201 C 12/2008

* cited by examiner

*Primary Examiner* — Vincent Rudolph
*Assistant Examiner* — Raphael Schwartz
(74) *Attorney, Agent, or Firm* — FisherBroyles, LLP

(57) ABSTRACT

Various embodiments are directed to deriving spatial attributes for imaged objects utilizing three-dimensional (3D) information. A server may obtain 3D survey data about an object from a pre-existing source. The server may then receive image data describing the object from a user device. The server may then utilize range imagery techniques to build a 3D point cloud from imagery in a pixel space. The server may then utilize horizontal positioning to place the 3D point cloud in proximity to the 3D survey data. The server may then fit the 3D survey data to the 3D point cloud. Finally, the server may record measurements and absolute locations of interest from the 3D point cloud and send them to the user device.

6 Claims, 3 Drawing Sheets

SYSTEMS AND METHODS FOR DERIVING SPATIAL ATTRIBUTES FOR IMAGED OBJECTS UTILIZING THREE-DIMENSIONAL INFORMATION

CROSS-REFERENCE TO RELATED APPLICATIONS

This application claims priority to and benefit of U.S. Patent Application Ser. No. 62/299,329 filed on Feb. 24, 2016, and entitled "Systems and Methods for Deriving Spatial Attributes for Imaged Objects Utilizing Three-Dimensional Information." The disclosure of the aforementioned application is entirely incorporated herein by reference.

TECHNICAL FIELD

Embodiments of the disclosure relate generally to surveying, and more specifically to performing surveys utilizing three-dimensional information to derive spatial attributes for imaged objects.

BACKGROUND

Professional ground and/or aerial surveys typically involve the derivation of accurate object positions and dimensions in the field. Furthermore, trained survey professionals are required to perform these surveys utilizing relatively expensive equipment to directly measure object positions within a local coordinate system. These measurements may persist for several hours or even days depending on the size and nature of the survey. Moreover, certain measurements (e.g., Earth Centered Earth Fixed (ECEF) measurements) require post-processing in order to place raw coordinate data into meaningful earth-specific space. It is with respect to these considerations and others that the various embodiments of the present invention have been made.

DETAILED DESCRIPTION

Figure 1:
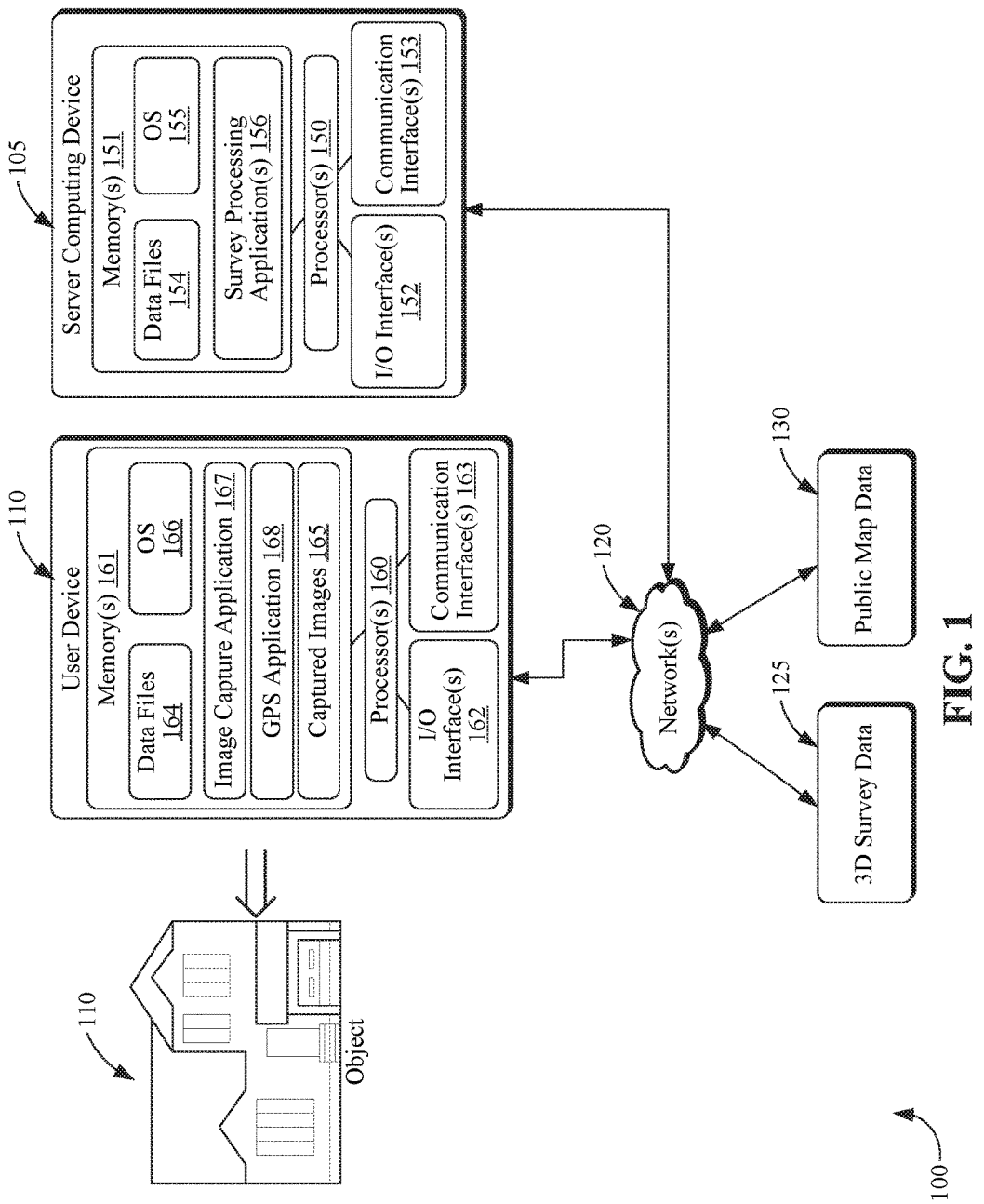
FIG. 1 illustrates a block diagram of an example system that may be utilized in accordance with various embodiments.

Various embodiments of the disclosure are directed to systems and methods for deriving spatial attributes for imaged objects utilizing three-dimensional (3D) information. According to an aspect of the disclosure, a server may initiate a first data collection step in which 3D survey data about an object is obtained from a pre-existing source. For example, the server may obtain 3D survey data previously gathered utilizing aerial scanning Light Detection And Ranging (LiDAR) techniques, from a data center. Alternatively, the server may obtain 3D survey data previously gathered utilizing photogrammetric methods or Radio Detection and Ranging (RADAR) techniques. The server may then initiate a second data collection step in which image data describing the object is received from a user. For example, the image data may include several images collected by a user device (e.g., a mobile device, etc.), from convergent angles of the object, to indicate a rough horizontal position from pre-existing public map data and further to indicate known object vertices that would be available within the 3D survey data.

The server may then initiate a first post processing step that may include utilizing range imagery techniques (such as Structure from Motion (SfM)) to build a 3D point cloud from the image data in a pixel space. The server may then initiate a second post processing step that may include utilizing the rough horizontal positioning to place the 3D point cloud in rough proximity to the pre-existing 3D survey data. The rough approximation may utilize manual or automatic input from the user device. The server may then initiate a third post processing step that may include fitting the 3D survey data to the 3D point cloud to exploit the known object vertices (i.e., previously identified vertices) as registration points. For example, the third processing step may include scaling, rotating, and translating the 3D point cloud to the 3D survey data. The fit may then be refined through additional processing methods (e.g., Iterative Closest Point (ICP) processing). As another example, the third processing step may include exploiting known spatial characteristics of an object within an imaged scene. These characteristics may be Vertical Targets of Interest (VTOIs) that have a known height and width in world coordinates and which can be used to extract an image-to-world spatial relationship. Once this relationship is known, the 3D survey data and the 3D point cloud may be joined without the use of the aforementioned registration points thereby decreasing the level of effort required by the user as well as processing complexity. Following the third processing step, the server may then record measurements and absolute locations of interest from the 3D point cloud and send or report them to the user device.

In accordance with the embodiments of the disclosure described herein, the accuracy of generating survey data is increased as compared to traditional methods. Moreover, data that was previously undetected within pre-existing 3D data using traditional methods may be resolved due to a higher fidelity 3D point cloud being generated from imagery in a pixel space. This additional data may provide a user insight into asset or property compliance that could not be gleaned from sparse pre-existing 3D data. Furthermore, the embodiments described herein provide a user with full control over the scan frequency (and thus the temporal resolution) of a target object, thereby allowing for higher fidelity and more meaningful change detection among specific assets (i.e., objects) to be surveyed. For example, a survey of objects at a construction site may change over time based on a reduced soil volume associated with ongoing building construction. In accordance with the embodiments described herein, more recent images of ongoing changes at an object location may be captured for survey data generation than would otherwise be available using traditional survey methods due to an interested user having greater accessibility to the location.

Embodiments of the disclosure now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

System Overview FIG. 1 represents a block diagram of an example system 100 for deriving spatial attributes for imaged objects utilizing three-dimensional (3D) information, according to one embodiment. As shown in FIG. 1, the system 100 may include at least one server computing device 105, one or more user devices 115 and data repositories for storing 3D survey data 125 and public map data 130. As desired, one or more suitable networks 120 may facilitate communication between various components of the system 100.

With reference to FIG. 1, the server computing device 105 may utilize 3D information to facilitate deriving spatial attributes for one or more imaged objects such as object 110 which may comprise, for example, a building to be surveyed. As desired, the server computing device 105 may include any number of processor-driven devices, including but not limited to, a mobile computer, an application-specific circuit, a minicomputer, a microcontroller, and/or any other processor-based device. The server computing device 105 may utilize one or more processors 150 to execute computer-readable instructions that facilitate the general operation of the server computing device 105 and/or the derivation of spatial attributes for the object 110.

In addition to having one or more processors 150, the server computing device 105 may further include and/or be associated with one or more memory devices 151, input/output ("I/O") interface(s) 152, and/or communication and/or network interface(s) 153. The memory 151 may be any computer-readable medium, coupled to the processor(s) 150, such as random access memory ("RAM"), read-only memory ("ROM"), and/or a removable storage device. The memory 151 may store a wide variety of data files 154 and/or various program modules, such as an operating system ("OS") 155 and one or more survey processing applications 156.

The data files 154 may include any suitable data that facilitates the operation of the server computing device 105 and/or interaction of the server computing device 105 with one or more other components of the system 100. For example, the data files 154 may include information associated with invoking a survey processing application 156, information that facilitates the collection of image data, information that facilitates the collection of 3D survey data 125, and information that facilitates the collection of public map data 130, and/or information that facilitates the output of information to a recipient system (e.g., user device 115) in association with derived spatial attributes (e.g., measurements and locations of interest) for the object 110.

The OS 155 may be suitable module that facilitates the general operation of the server computing device 110, as well as the execution of other program modules. For example, the OS 155 may be, but is not limited to, Microsoft Windows®, Apple OSX™, Unix, a mainframe computer operating system (e.g., IBM z/OS, MVS, OS/390, etc.), or a specially designed operating system.

The survey processing application 156 may include one or more suitable software modules and/or applications configured to facilitate obtaining the 3D survey data 125. Additionally, the survey processing application 156 may be configure to facilitate receiving image data about the object 110 collected by the user device 115. Additionally, in certain embodiments, the survey processing application 156 may be configured to facilitate the building of a 3D point cloud in a pixel space. As should be understood by those of ordinary skill in the art, a 3D point cloud may include a set of data points in a three-dimensional coordinate system that are intended to represent the external surface of an object. Additionally, the survey processing application 156 may be configured to facilitate utilizing horizontal positioning to place the 3D point cloud in proximity to the 3D survey data 125 and to fit the 3D survey data 125 to the 3D point cloud. In certain embodiments, the survey processing application 156 may be configured to facilitate recording measurements and locations of interest from the 3D point cloud after it has been fitted to the 3D survey data 125. The survey processing application 156 may further be configured to facilitate directing the communication of the measurements and locations of interest (with respect to the object 110) to user device 115. It should be understood that any number of suitable networks 120 (e.g., a local area network, the Internet, a cellular or mobile network, etc.) may be utilized to facilitate communication of the measurements and locations of interest (with respect to the object 110) to user device 115.

A few examples of the operations that may be performed by the survey processing application 156 and/or the server computing device 105 are described in greater detail below with reference to FIGS. 2-3.

The one or more I/O interfaces 152 may facilitate communication between the server computing device 105 and one or more input/output devices; for example, one or more user interface devices, such as a display, a keypad, a touch screen display, a microphone, a speaker, etc., that facilitate user interaction with the server computing device 105. The one or more network and/or communication interfaces 153 may facilitate connection of the server computing device 105 to one or more suitable networks, for example, the network(s) 120. In this regard, the server computing device 105 may receive and/or communicate information to other components of the system 100 (such as user computing device 115, the 3D survey data 125, and the public map data 130).

With continued reference to FIG. 1, any number of user devices 110 may be provided. User device 115 may include, but is not limited to, a mobile device (e.g., a mobile phone, smartphone, tablet computing device, etc.), a desktop computing device, and a laptop computing device. In operation, user device 115 may facilitate the collection of images of object 110 (which may comprise, for example, a building to be surveyed) utilizing image capture application 167 and/or a global navigation satellite system ("GNSS") application such as, for example, Global Positioning System ("GPS") application 168. In certain embodiments, user device 115 may additionally be equipped with an image capture device (such as a camera), a GPS receiving device, and/or other devices.

As desired, user device 115 may include any number of processor-driven devices, including but not limited to, a mobile computer, an application-specific circuit, a minicomputer, a microcontroller, and/or any other processor-based device. User device 115 may utilize one or more processors 160 to execute computer-readable instructions that facilitate the general operation of user device 115 (e.g., call functionality, etc.) and/or the collection of image data (e.g., images 165) describing the object 110.

In addition to having one or more processors 160, user device 115 may further include and/or be associated with one or more memory devices 161, input/output ("I/O") interface(s) 162, and/or communication and/or network interface(s) 163. The memory 161 may be any computer-readable medium, coupled to the processor(s) 160, such as random access memory ("RAM"), read-only memory ("ROM"), and/or a removable storage device. The memory 161 may store a wide variety of data files 164 and/or various program modules, such as an operating system ("OS") 166, image capture application 167 and/or GPS application 168.

The data files 164 may include any suitable data that facilitates the operation of user device 115 and/or interaction of user device 115 with one or more other components of the system 100. For example, the data files 164 may include information associated with accessing invoking image capture application 167 and GPS application 158 to capture images 165 and/or GPS coordinates for the object 110 and information associated with receiving data (e.g., measurements and locations of interest determined for the object 110) from the server processing application 156 executing on the server computing device 105.

The OS 166 may be suitable module that facilitates the general operation of user device 115, as well as the execution of other program modules. For example, the OS 166 may be, but is not limited to, a suitable mobile OS or a specially designed operating system. As desired, user device 115 may additionally include one or more communication modules that facilitate interaction with other user devices and/or other communications functionality. For example, a suitable near field communication module, radio frequency module, Bluetooth module, or other suitable communication module may be included in user device 115.

The image capture application 167 may include one or more suitable software modules and/or applications configured to facilitate the collection of the images 165 information and/or other related information. Additionally, the image capture application 167 may be configured to facilitate the communication of the images 165 (i.e., image data) to the server computing device 105. In operation, a user of user device 115 may invoke the image capture application 167 at an object location to be surveyed. For example, the image capture application 167 may be invoked while the user is in front of a building. Once activated, the image capture application 167 may facilitate the collection of multiple images of the building at convergent angles to indicate a rough horizontal position from pre-existing public map data and further to indicate known object vertices that would be available within separately available 3D survey data (e.g., the 3D survey data 125).

With continued reference to user device 115, the one or more I/O interfaces 162 may facilitate communication between user device 115 and one or more input/output devices; for example, one or more user interface devices, such as a display, a keypad, a mouse, a pointing device, a control panel, a touch screen display, a remote control, a microphone, a speaker, etc., that facilitate user interaction with user device 115. The one or more network and/or communication interfaces 163 may facilitate connection of user device 115 to one or more suitable networks and/or communication links. In this regard, user device 115 may receive and/or communicate information to other components of the system 100, such as the server computing device 105, and/or other devices and/or systems.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration.

Figure 2:
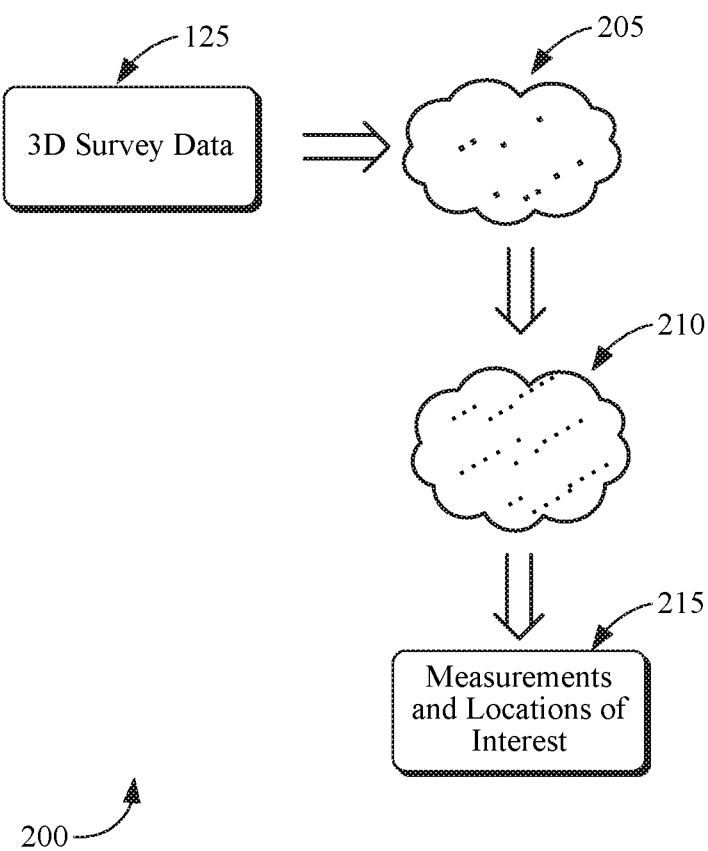
FIG. 2 illustrates a block diagram of a server computing device in the example system of FIG. 1 determining measurements and locations of interest for an object utilizing 3D survey data and a 3D point cloud, according to an example embodiment.

FIG. 2 illustrates a block diagram 200 of the server computing device 105 being utilized to determine measurements and locations of interest for an object utilizing the 3D survey data 125 and a 3D point cloud, according to an example embodiment. Turning now to FIG. 2, the survey processing application 156 may be configured to fit the 3D survey data 125 to a 3D point cloud 205 generated from image data (i.e., the images 165) captured by user device 115 of the object 110. After fitting the 3D survey data 125 to the 3D point cloud 205, a refined (i.e., updated) 3D point cloud 210 is generated. From the refined 3D point cloud 210, the survey processing application 156 may be configured to record measurements and locations of interest 215 for the object 110 for communication back to user device 115. Example operations that may be performed in fitting the 3D survey data 125 to the 3D point cloud 205 are described in greater detail below with reference to FIG. 3.

Operational Overview

Figure 3:
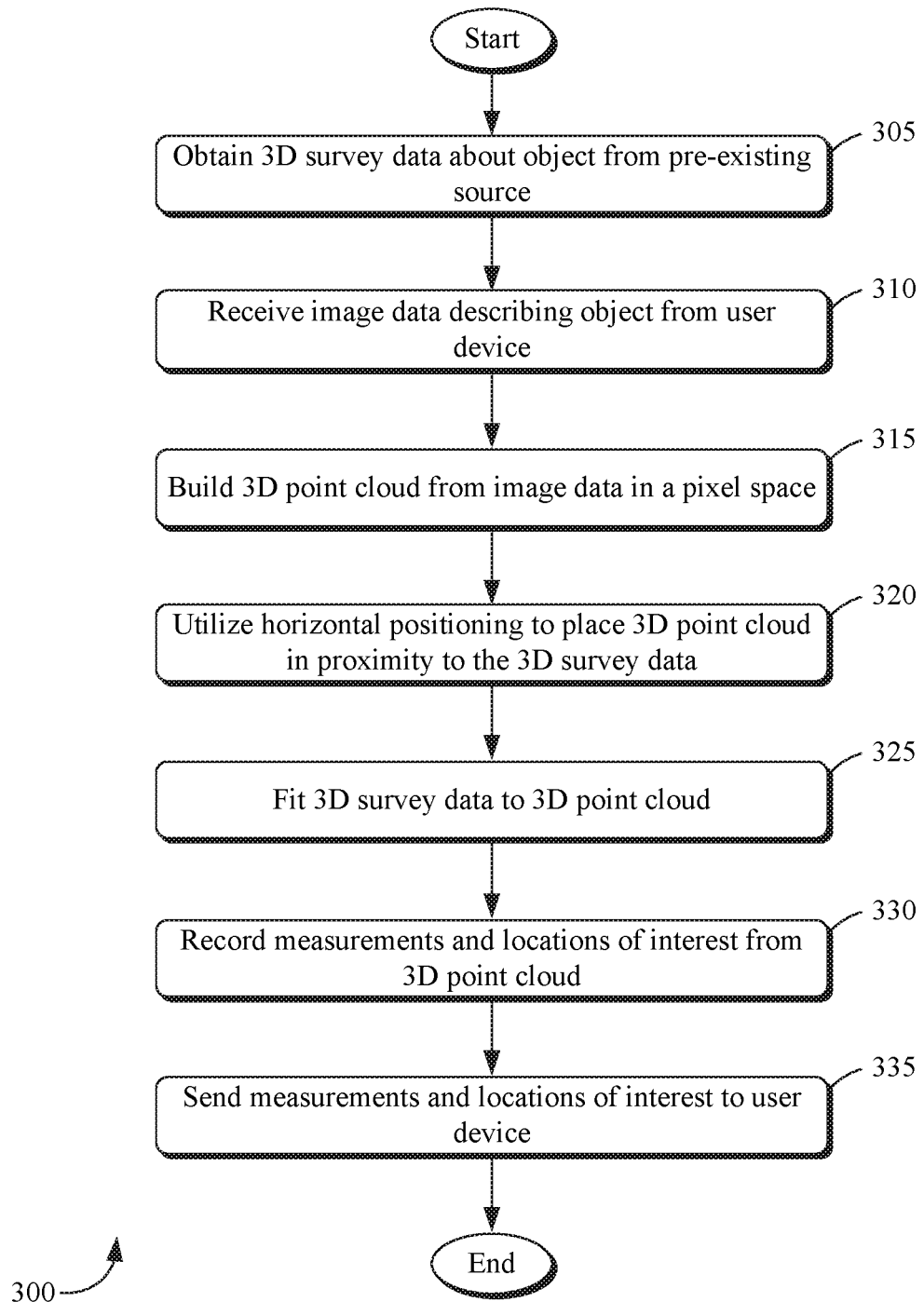
FIG. 3 illustrates a flow diagram of an example process for deriving spatial attributes for imaged objects utilizing three-dimensional (3D) information, according to an example embodiment.

FIG. 3 illustrates a flow diagram of an example process 300 for deriving spatial attributes for imaged objects utilizing three-dimensional (3D) information, according to an example embodiment. In certain embodiments, the operations of the example process 300 may be performed by a server computing device, such as the server computing device 105 illustrated in FIG. 1. The method 300 may begin at block 305.

At block 305, the survey processing application 156 (executing on the server computing device 105) may obtain 3D survey data about an object from a pre-existing source. For example, the survey processing application 156 may retrieve previously gathered 3D survey data 125 from a data center or other repository. In certain embodiments, the 3D survey data 125 may have been previously gathered utilizing aerial scanning LiDAR techniques. In other embodiments, the 3D survey data 125 may be been gathered utilizing photogrammetric methods or RADAR techniques.

At block 310, the survey processing application 156 may receive image data describing the object 110 from user device 115. For example, the image data may include the images 165 and/or GPS coordinates captured by a user of user device 115 utilizing the image capture application 167 and/or the GPS application 168. In certain embodiments, the image data may include several of the images 165 captured from convergent angles of the object 110 to indicate a rough horizontal position from pre-existing public map data and further to indicate known object vertices that would be available within the 3D survey data 125.

At block 315, the survey processing application 156 may build a 3D point cloud (i.e., the 3D point cloud 205 of FIG. 2), from the image data received at block 310, in a pixel space. In certain embodiments, the 3D point cloud may be built utilizing range imagery techniques such as Structure from Motion (SfM). As known to those of ordinary skill in the art, SfM techniques include processes for estimating three-dimensional structures from two-dimensional image sequences. Other range imagery techniques may also be utilized.

At block 320, the survey processing application 156 may utilize horizontal positioning to place the 3D point cloud (built at block 315) in proximity to the 3D survey data 125. In certain embodiments, rough horizontal positioning may be utilized to place the 3D point cloud in rough proximity to the (pre-existing) 3D survey data 125. In some embodiments, the rough approximation may utilize manual or automatic input received from user device 115.

At block 325, the survey processing application 156 may fit the 3D survey data 125 to the 3D point cloud (built at block 315). In certain embodiments, the 3D survey data 125 may be fitted to exploit known object vertices (i.e., the object vertices indicated in the image data obtained at block 310) as registration points. In particular, the 3D survey data 125 may be fit to the 3D point could by scaling, rotating, and translating the 3D point cloud to the 3D survey data 125. In certain embodiments, the fit may then be refined through additional processing methods such as Iterative Closest Point (ICP) processing. Other processing method may also be utilized. In an alternative embodiment, the fitting of the 3D survey data 125 to the 3D point cloud may include exploiting known spatial characteristics of an object (i.e., the object 110) within an imaged scene. These characteristics may be, for example, Vertical Targets of Interest (VTOIs) that have a known height and width in world coordinates and which can be used to extract an image-to-world spatial relationship. Once this relationship is known, the 3D survey data 125 and the 3D point cloud may be joined without the use of the aforementioned registration points.

At block 330, the survey processing application 156 may record measurements and locations of interest associated with the object 110 from a refined 3D point cloud generated from the fitting of the previously built 3D point cloud and the 3D survey data 125.

At block 335, the survey processing application 156 may send the measurements and locations of interest associated with the object 110 (recorded at block 330) to user device 115.

The process 300 may end following block 335.

Various embodiments of the invention are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

Various block and/or flow diagrams of systems, methods, apparatus, and/or computer program products according to example embodiments are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

The computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. The computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A system comprising:
    at least one processor; and
    at least one memory storing computer-executable instructions that when executed by the at least one processor, cause the system to:
        obtain three-dimensional (3D) survey data about an object from a pre-existing source, wherein the source comprises a data center storing previously gathered aerial scanning Light Detection and Ranging (LiDAR) data;
        receive image data describing the object from a user device, wherein the image data comprises a plurality of images representing the object received from a user of image capture and global navigation satellite system applications invoked on the user device when the user is positioned in front of the object at an object location to be surveyed, the plurality of images captured from one or more convergent angles of the object;
        build a 3D point cloud from the image data in a pixel space;
        in response to an input received from the user device, utilize horizontal positioning to place the 3D point cloud in proximity to the 3D survey data;
        fit the 3D survey data to the 3D point cloud by exploiting one or more known spatial characteristics of the object within an imaged scene, the known spatial characteristics having a known height and a known width in world coordinates;

generate a refined 3D point cloud by joining the 3D survey data and the 3D point cloud;
record, from the refined 3D point cloud, measurements and locations of interest for the object; and
send the measurements and the locations of interest to the user device.

2. The system of claim 1, wherein the plurality of images captured from the one or more convergent angles of the object indicate a horizontal position from public map data and one or more object vertices available within the 3D survey data.

3. A method comprising:
obtaining, by a computing device, three-dimensional (3D) survey data about an object from a pre-existing source, wherein the source comprises a data center storing previously gathered aerial scanning Light Detection and Ranging (LiDAR) data;
receiving, by the computing device, image data describing the object from a user device, wherein the image data comprises a plurality of images representing the object received from a user of image capture and global navigation satellite system applications invoked on the user device when the user is positioned in front of the object at an object location to be surveyed, the plurality of images captured from one or more convergent angles of the object;
building, by the computing device, a 3D point cloud from the image data in a pixel space;
in response to an input received from the user device, utilizing, by the computing device, horizontal positioning to place the 3D point cloud in proximity to the 3D survey data;
fitting, by the computing device, the 3D survey data to the 3D point cloud by exploiting one or more known spatial characteristics of the object within an imaged scene, the known spatial characteristics having a known height and a known width in world coordinates;
generating, by the computing device, a refined 3D point cloud by joining the 3D survey data and the 3D point cloud;
recording, by the computing device, from the refined 3D point cloud, measurements and locations of interest for the object; and
sending, by the computing device, the measurements and the locations of interest to the user device.

4. The method of claim 3, wherein the plurality of images captured from the one or more convergent angles of the object indicate a horizontal position from public map data and one or more object vertices available within the 3D survey data.

5. One or more non-transitory computer-readable media configured to store computer-executable instructions that, when executed by one or more processors, configure the one or more processors to:
obtain three-dimensional (3D) survey data about an object from a pre-existing source, wherein the source comprises a data center storing previously gathered aerial scanning Light Detection and Ranging (LiDAR) data;
receive image data describing the object from a user device, wherein the image data comprises a plurality of images representing the object received from a user of image capture and global navigation satellite system applications invoked on the user device when the user is positioned in front of the object at an object location to be surveyed, the plurality of images captured from one or more convergent angles of the object;
build a 3D point cloud from the image data in a pixel space;
in response to an input received from the user device, utilize horizontal positioning to place the 3D point cloud in proximity to the 3D survey data;
fit the 3D survey data to the 3D point cloud by exploiting one or more known spatial characteristics of the object within an imaged scene, the known spatial characteristics having a known height and a known width in world coordinates;
generate a refined 3D point cloud by joining the 3D survey data and the 3D point cloud;
record, from the refined 3D point cloud, measurements and locations of interest for the object; and
send the measurements and the locations of interest to the user device.

6. The one or more non-transitory computer-readable media of claim 5, wherein the plurality of images captured from the one or more convergent angles of the object indicate a horizontal position from public map data and one or more object vertices available within the 3D survey data.

* * * * *